United States Patent
Dunton

(10) Patent No.: US 6,835,907 B2
(45) Date of Patent: Dec. 28, 2004

(54) WELDING TORCH

(76) Inventor: Alan Dunton, 18 Townsville Avenue, Whitely Bay, Tyne & Wear, NE25 9DG (GB)

( * ) Notice: Subject to any disclaimer, the term of this patent is extended or adjusted under 35 U.S.C. 154(b) by 0 days.

(21) Appl. No.: 10/475,279

(22) PCT Filed: Apr. 16, 2002

(86) PCT No.: PCT/GB02/01760

§ 371 (c)(1),
(2), (4) Date: Oct. 20, 2003

(87) PCT Pub. No.: WO02/083353

PCT Pub. Date: Oct. 24, 2002

(65) Prior Publication Data

US 2004/0129682 A1 Jul. 8, 2004

(30) Foreign Application Priority Data

Apr. 18, 2001 (GB) .............................. 0109707

(51) Int. Cl.$^7$ ................................. B23K 9/29
(52) U.S. Cl. ..................................... 219/75
(58) Field of Search .................. 219/75, 136

(56) References Cited

U.S. PATENT DOCUMENTS

| | | | | |
|---|---|---|---|---|
| 2,784,294 A | * | 3/1957 | Gravert | 219/75 |
| 2,798,145 A | * | 7/1957 | Vogel | 219/75 |
| 3,030,489 A | * | 4/1962 | Schaefer | 219/75 |
| 3,097,290 A | * | 7/1963 | Guida | 219/75 |
| 3,296,407 A | * | 1/1967 | Wallace | 219/75 |
| 4,918,280 A | * | 4/1990 | Jankus | 219/75 |

* cited by examiner

*Primary Examiner*—Clifford C. Shaw
(74) *Attorney, Agent, or Firm*—Stites & Harbison PLLC; Douglas E. Jackson

(57) ABSTRACT

A welding torch, in particular a tungsten inert gas (TIG) welding torch, comprises a body portion (2) in which is housed an elongate, non-consumable electrode (10) the tip of which projects from the body portion (2), clamping means (8) within the body portion (2) for releasably gripping the electrode (10), control means (18) selectively movable between a first position in which the clamping means (8) hold the electrode (10) in an operative position, and a second position in which the clamping means (8) are released from the electrode (10), and an ejector mechanism (16) which, with the control means (18) in its second position, can be actuated to move the electrode (10) axially within the body portion (2).

6 Claims, 2 Drawing Sheets

WELDING TORCH

TECHNICAL FIELD

This invention relates to welding torches, and more particularly to such torches incorporating non-consumable electrodes, typically of tungsten.

BACKGROUND OF THE INVENTION

Tungsten inert gas (TIG) welding torches conventionally comprise a body portion in which is housed an elongate tungsten electrode one end of which projects from the body portion for welding purposes.

More particularly, the tungsten electrode is held in a split collet, itself housed within the body portion of the torch, the split tip of the collet being received within a tapering bore such that, when the collet is pushed forwards within the bore, the split tip thereof is urged into clamping engagement with the electrode to hold the electrode in its operative condition.

Conventionally, the split collet is pushed forwards by means of a threaded plug or backstop which is screwed into the body member to react against the rear end of the collet.

Ideally, the projecting tip of the tungsten electrode should not touch the parent metal during the welding process. However, in practice, and primarily because welding is a manual process, there is often contact, the electrode becomes contaminated, and it is necessary to remove the electrode from the torch, either to grind off the contamination or to replace the electrode.

In theory, when the threaded backstop is partially unscrewed within the body portion, the clamping effect of the split collet on the electrode should be released, whereby the electrode can be pulled out of the ceramic nozzle end of the body portion by the user's gloved forefinger and thumb.

However, in practice, the heat generated during the welding process is often such that the split collet becomes adhered to the tungsten electrode, whereby unscrewing of the backstop does not release the split collet from the electrode, and the electrode cannot be removed from the torch other than by completely dismantling the torch.

Clearly this is a tedious, time consuming and inefficient exercise, which can also be painful to the operator because the torch assembly is extremely hot.

Furthermore, it is difficult to ensure that the decontaminated or replacement electrode is accurately positioned in the body portion when the torch is hot.

U.S. Pat. No. 3,097,290 discloses a welding torch substantially in accordance with the pre-characterising clause of claim 1.

SUMMARY OF THE INVENTION

It would be desirable to be able to provide a welding torch in which the non-consumable electrode thereof was more readily handleable than heretofore.

According to the present invention there is provided a welding torch comprising a body portion in which is housed, and from one end of which projects the tip of, an elongate, non-consumable electrode, clamping means within the body portion for releasably gripping the electrode, a plug member selectively movable between a first position in which the clamping means hold the electrode in an operative position, and a second position in which the clamping means are released from the electrode, and an ejector mechanism which, with the plug member in its second position, can be actuated to move the electrode axially within the body portion, characterised in that the ejector mechanism comprises a slide member mounted in the plug member to be axially slidable therein, and a push rod mounted to the slide member to extend axially therefrom and through the plug member into the body portion, the push rod being co-axial with the electrode and adapted to engage the end of the electrode remote from the tip, whereby, with the plug member in its second, release position, the slide member and push rod can be moved axially within the plug member and the body portion to move the electrode axially from its operative position.

In a preferred embodiment of the invention, the clamping means comprises a split collet surrounding an intermediate extent of the electrode and having a foremost operative position within the body portion clamping the electrode and a release position axially rearwards of the operative position.

Conveniently the plug member is screwed into the body portion and has a first, operative position in which an end face thereof engages the split collet and urges the collet into clamping engagement with the electrode, and a second, release position rotationally displaces from the first position in which the end face thereof is displaced axially rearwardly of the first position to enable release of the collet from the electrode.

Preferably, the mounting of the push rod to the slide member is such that, for a given axial position of the slide member within the plug member, the push rod can be moved axially relative to the slide member.

Conveniently axial movement of the push rod relative to the slide member is achieved by rotation of the slide member within the plug member.

In one embodiment of the invention, the slide member is internally threaded, the push rod extending from an externally threaded head member housed within the slide member, the push rod extending through the plug member to be axially movable but non-rotatable relative thereto whereby, on rotation of the slide member within the plug member, the head member and push rod are moved axially relative to the slide member and plug member.

DESCRIPTION OF THE PREFERRED EMBODIMENT

Figure 1:
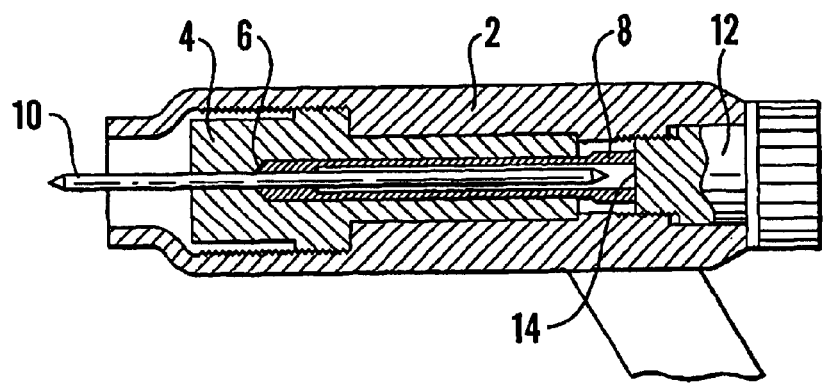
FIG. 1 is a longitudinal section through a part of a conventional TIG welding torch.

Referring to FIG. 1 there is shown a conventional TIG welding torch comprising an elongate body portion 2 containing a gas lens 4 in which is formed an axial recess the forward end 6 of which is of generally tapering conical configuration.

A split collet 8 is housed within the recess, the configuration of the split front end of the collet 8 conforming with that of the forward end 6 of the recess.

An elongate tungsten electrode 10 of circular cross-section extends through the collet 8 with the front tip thereof projecting from the body portion 2.

The torch is completed by a plug 12 which screws into the rear end of the body portion 2 and has a fully inserted operative position in which an end face 14 thereof engages the end of the collet 8 and pushes the collet 8 axially forwards within the body portion 2 such that the split front end thereof is urged into the forward end 6 of the recess whereby the collet 8 securely grips the electrode 10 and retains it in an operative position.

In order to release the collet 8 from its grip on the electrode 10, the plug 12 is unscrewed to disengage the end face 14 thereof from the collet 8 whereby the collet 8 can move axially rearwardly within the recess.

However, as detailed above, the split collet 8 often becomes adhered to the electrode 10 whereby the grip of the collet 8 on the electrode 10 is not released on unscrewing of the plug 12. The extent of the electrode 10 projecting from the body portion 2 is usually short, making it difficult, if not impossible, to pull the electrode 10 out manually.

Figure 3:
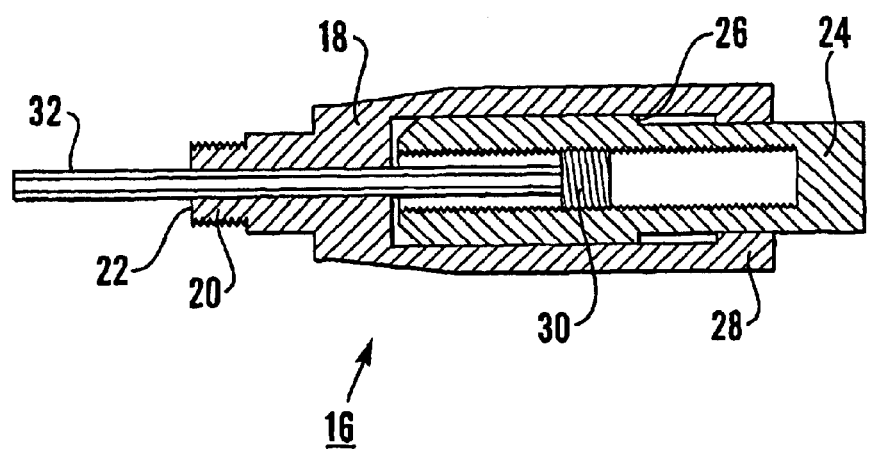
FIG. 3 is a longitudinal section through the ejector mechanism of the torch of FIG. 2.
Figure 2:
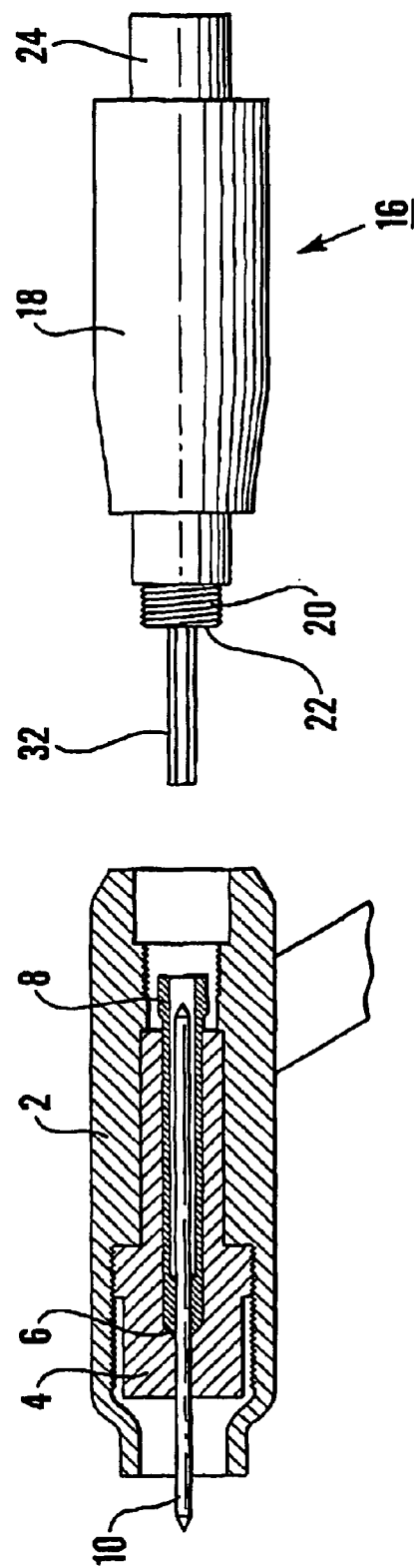
FIG. 2 is an exploded view, partly in longitudinal section, of a welding torch according to the invention.

The invention provides means for overcoming these problems, and will be described with reference to FIGS. 2 and 3.

The plug 12 of the conventional torch is replaced by an ejector mechanism indicated generally at 16 and comprising a plug member 18 having a threaded portion 20 with an end face 22 for screwing into the rear of the body portion 2 in the manner of the plug 12.

The plug member 18 is hollow and houses a generally hollow cylindrical slide member 24 therein the rear end of which projects rearwardly from the plug member 18. The member 24 is slidable axially within the plug member 18 between a foremost position determined by abutment of the front end of the slide member 24 with a front end face of the hollow interior of the plug member 18, and a rearmost position determined by abutment of a shoulder 26 on the slide member 24 with a rear end wall 28 of the plug member 18.

As well as being slidable axially within the plug member 18, the slide member 24 is rotatable in said member 18 for reasons which will become apparent.

The hollow interior of the slide member 24 is internally threaded and houses therein an externally threaded cylindrical head or piston 30 to which is secured an elongate push rod 32 of non-circular, preferably hexagonal, cross-section, the push rod 32 extending through a correspondingly shaped bore in the plug member 18 to project forwardly therefrom, whereby the push rod 32 is guided for axial movement relative to the plug member 18, but rotational movement relative to the plug member 18 is restrained.

It will thus be appreciated that the construction of the ejector mechanism as described is such that, for a given position of the plug member 18, the slide member 24 together with the piston 30 and the push rod 32 can be moved axially backwards and forwards within the plug member 18 between the foremost and rearmost positions of the slide member 24 within the plug member, and, for a given axial position of the slide member 24 within the plug member 18, the slide member 24 can be rotated within the plug member 18 whereby the threaded piston 30 and the push rod 32 are moved axially relative to the plug member 18 in a direction determined by the direction of rotation of the slide member 24.

In use, the ejector mechanism 16 is screwed into the body portion, the end face 22 of the threaded portion 20 of the plug member 18 engaging the rear end of the collet 8 whereby, with the plug member fully screwed into the body portion 2, the split end of the collet 8 grips the electrode 10 and secures it in its operative position with the front tip thereof projecting from the body portion 2. In this condition of the torch, the ejector mechanism 16 is inoperative.

When it is desired to remove or adjust the electrode 10, the plug member 18 is unscrewed, typically about one quarter of a turn, to disengage the end face 22 of the threaded portion 20 from the collet 8 and whereby the grip of the collet 8 on the electrode 10 is released. The slide member 24, together with the piston 30 and push rod 32, can then be moved as a unit further into the body portion 2 whereby the free end of the push rod 32 engages the rear end of the electrode 10 and pushes the electrode forwards out of any remaining grip by the collet 8 and further out of the front end of the body portion whereby the electrode can be readily gripped and totally withdrawn from the torch.

Thus, it will be appreciated that the ejector mechanism 16 enables a considerable axial force to be applied to the electrode 10, either by pushing or impacting upon the slide member 24, whereby any remanent gripping of the electrode 10 by the collet 8 can be overcome, and removal of the electrode 10 from the body portion 2 is readily achieved for decontamination or replacement purposes.

On insertion of the electrode 10 into the body portion 2, and prior to clamping of the electrode 10 by the split collet 8, the axial position of the electrode 10 in the body portion 2 can be accurately set by means of the ejector mechanism 16. More particularly, and with the slide member 24 in a given axial position within the plug member 18 with the free end of the push rod 32 engaging the inner end of the electrode 10, rotation of the slide member 24 moves the push rod axially relative to the body portion 2 whereby the precise axial position of the electrode 10 can be fine tuned. Once the desired position is reached, the plug member 18 is screwed into the body portion 2 to engage the collet 8 and clamp the electrode 10 in that position.

Thus there is provided a welding torch which gives the operator complete control over movement of the tungsten electrode within the torch when previously there was none. Total removal is readily achieved despite potential adherence to the clamping means, while adjustment of stick-out length is greatly simplified and can be set extremely accurately.

Clearly the precise construction of the ejector mechanism 16 could differ from that described and illustrated without departing from the scope of the invention. In particular the means for achieving axial movement of the push rod may take a variety of different forms, for example by making the push rod itself externally threaded to be rotatable in a threaded nut carried by a slide member, the nut being restrained from rotation with the slide member but axially movable therewith.

Other modifications and variations will be apparent to those skilled in the art.

What is claimed is:

1. A welding torch comprising a body portion (2) in which is housed, and from one end of which projects the tip of, an elongate, non-consumable electrode (10), clamping means (8) within the body portion (2) for releasably gripping the electrode (10), a plug member (18) selectively movable between a first position in which the clamping means (8) hold the electrode (10) in an operative position, and a second position in which the clamping means (8) are released from the electrode (10), and an ejector mechanism (16) which, with the plug member (18) in its second position, can be actuated to move the electrode (10) axially within the body portion (22), characterised in that the ejector mechanism (16) comprises a slide member (24) mounted in the plug member (18) to be axially slidable therein, and a push rod (32) mounted to the slide member (24) to extend axially therefrom and through the plug member (18) into the body portion (2), the push rod (32) being co-axial with the electrode (10) and adapted to engage the end of the electrode (10) remote from the tip, whereby, with the plug member (18) in its second, release position, the slide member (24) and push rod (32) can be moved axially within the plug member (18) and body portion (2) to move the electrode (10) axially from its operative position.

2. A welding torch as claimed in claim 1 in which the clamping means comprises a split collet (8) surrounding an intermediate extent of the electrode (10) and having a foremost operative position within the body portion (2) clamping the electrode (10) and a release position axially rearwards of the operative position.

3. A welding torch as claimed in claim 2 in which the plug member (18) is screwed into the body portion (2) and has a first, operative position in which an end face (22) thereof engages the split collet (8) and urges the collet (8) into clamping engagement with the electrode (10), and a second, release position rotationally displaced from the first position in which the end face (22) thereof is displaced axially rearwardly of the first position to enable release of the collet (8) from the electrode.

4. A welding torch as claimed in claim 1 in which the mounting of the push rod (32) to the slide member (24) is such that, for a given axial position of the slide member (24) within the plug member (18), the push rod (32) can be moved axially relative to the slide member (24).

5. A welding torch as claimed in claim 4 in which axial movement of the push rod (32) relative to the slide member (24) is achieved by rotation of the slide member (24) within the plug member (18).

6. A welding torch as claimed in claim 5 in which the slide member (24) is internally threaded, the push rod (32) extending from an externally threaded head member (30) housed within the slide member (24), the push rod (32) extending through the plug member (18) to be axially movable but non-rotatable relative thereto whereby, on rotation of the slide member (24) within the plug member (18), the head member (30) and push rod (32) are moved axially relative to the slide member (24) and plug member (18).

* * * * *